(12) United States Patent
Macgowan et al.

(10) Patent No.: US 6,401,669 B1
(45) Date of Patent: Jun. 11, 2002

(54) CONDENSING BOILER

(75) Inventors: Kenneth Bruce Macgowan; Allan Lee Teron, both of Vancouver (CA)

(73) Assignee: IBC Technologies, Vancouver (CA)

( * ) Notice: Subject to any disclaimer, the term of this patent is extended or adjusted under 35 U.S.C. 154(b) by 0 days.

(21) Appl. No.: 09/837,296

(22) Filed: Apr. 19, 2001

(51) Int. Cl.[7] .............................................. F22B 37/42
(52) U.S. Cl. ................... 122/448.1; 122/406.1
(58) Field of Search ............................. 122/14.1, 15.1, 122/406.1, 460, 249, 448.1

(56) References Cited

U.S. PATENT DOCUMENTS 3,834,355 A  *  9/1974  Arant ...................... 122/406.1
4,651,680 A  *  3/1987  Couprie ...................... 122/14.1
4,712,515 A  * 12/1987  Couprie ...................... 122/7 R
5,281,309 A  *  1/1994  Greene ........................ 202/181

* cited by examiner

Primary Examiner—Gregory Wilson
(74) Attorney, Agent, or Firm—Norman M. Cameron

(57) ABSTRACT

A condensing boiler includes a heat exchanger with a burner adjacent to the top of the heat exchanger. There is an exhaust for condensate adjacent to the bottom of the heat exchanger. There is a intake system including an air conduit, a fuel inlet and a fan which supplies a fuel/air mixture to the burner during a heating mode and which supplies air to the heat exchanger during an idle mode. There are controls which modulate the fan so that the air flow to the heat exchanger during the idle mode is sufficient to inhibit upward migration of condensate through the heat exchanger, but insufficient to cause significant outflow of air to the exhaust.

13 Claims, 7 Drawing Sheets

CONDENSING BOILER

BACKGROUND OF THE INVENTION

This invention relates to boilers and, in particular, to condensing boilers typically used for heating water for commercial or domestic applications such as space heating and domestic water heating.

Most heating systems using gas or oil combustion to operate at relatively low fuel efficiencies in order to exhaust flue gases well above the condensation point. This is done through sizing and configuration of the heat exchanger, to ensure that the temperature, time and turbulence factors affecting thermal transfer are sufficiently low as to provide exit flue gas temperatures above 270° F. Some units apply active anti-condensation measures such as supply water diversion/recirculation valves to maintain minimum return water temperatures above the condensation zone (e.g. 100° F. –140° F.). This is done to avoid the need to handle condensates with their inherent corrosive qualities, allowing the use of simple cast iron heat exchanger construction. Essentially this means losing 16–20 percent of the energy of the fuel which simply goes up the stack.

It has been recognized that condensing systems are inherently more efficient because they convert the latent heat of condensation into useful energy instead of expelling it with the exhaust. However liquid byproducts of the combustion must be contained and channelled away for disposal. Heat exchanger materials must be capable of withstanding the corrosive products encountered during wet-dry cycling. Steps should also be taken to ensure that the burner and igniter systems, along with other system elements such as sensors, are not fouled by moisture or condensation.

In a condensing furnace or boiler, water droplets are deposited on heat exchanger walls in zones where the flue temperature has cooled below 140° F. During normal firing/ heating operation, the wet zone would typically be spatially removed from sensitive hot zone components such as the burner and ignitor. However significant moisture often remains on a condensing heat exchanger's cool zone surface after burner shutdown. Such moisture can migrate within the heat exchanger and venting system following re-evaporation, driven by residual heat in the heat exchanger. Related convective air movements within the heat exchanger plenum can run counter to the normal on-cycle flow direction in a typical heat exchanger configuration which incorporates downflowing flue gases and condensates.

The typical response has been to use a two stage heat exchanger to separate the wet (condensate) zone from the igniter/burner area. The use of primary and secondary heat exchangers has been adopted to isolate the condensation from the combustion zone and limit the extent of corrosion resistant materials required. This approach is sensible for hot air furnaces where the components are relatively inexpensive and the added cost of a second stage of heat exchanger is not excessive.

However the use of primary and secondary heat exchangers is more burdensome in a hot water heating system with a boiler, due to American Society of Mechanical Engineers (ASME) pressure containment requirements.

Some recently introduced condensing boilers use dual heat exchangers. Such products employ a relatively conventional primary heat exchanger with an integral or mated/ external "pup" unit built to handle corrosive moisture. A trap is typically placed between the primary and secondary heat exchangers to block back flow of liquid flue products. Such an air trap may take the form of a mechanical vent damper or a thermal air trap. These occupy a significant space, rendering these products bulky and expensive to ship and install. The dual heat exchanger approach is typically costly, requiring two ASME pressure vessels plus communicating flue gas passageways.

A previous approach involved the use of a single section heat exchanger of copper or cupra-nickel. Such units employed direct spark ignition, a single speed AC blower and a simple control/safety circuit. A pre-purge is used to clear exhaust venting according to code requirements, but typically all activity terminates with the end of a call-for-heat, when an open thermostat cuts off the fan. Such units have suffered from metallurgical deterioration when copper breaks down under acidic attack to form sulfates or sulfides, leading to plugging of fluid paths and spark plug fouling due to the spark plugs becoming wet and corroded. In an attempt to overcome these problems, some units switched to hot-surface ignition (HSI). However in such cases the HSI element itself often failed, apparently due to moisture infiltration into its ceramic body.

Fans and controls for such heating appliances are typically unsophisticated, being unable to deliver air at varying flow rates or maintain control over fans and pumps in the post-firing period. Fans are typically of a split capacitor or shaded pole AC variety with little potential for variable speed. Recent developments with electronic frequency modulation provides some throttle range for AC motors. However turn down ratios of 3:1 are the typical limit.

If employed at all, a post purge cycle has been used to evacuate exhaust from the vent to reduce off-cycle condensation with cooling in the stack (which often cannot handle corrosives). However, controls available with existing boilers rarely offer post-firing functionality.

SUMMARY OF THE INVENTION

There is provided, according to an embodiment of the invention, a condensing boiler which includes a heat exchanger and having a top and a bottom. There is a burner adjacent to the top of the heat exchanger. An exhaust for spent flue gas and condensate is adjacent to the bottom of the heat exchanger. An intake system includes an air conduit, a fuel inlet and a fan which supplies a fuel/air mixture to the burner during a heating mode and which supplies air to the heat exchanger during an idle mode. Controls modulate the fan so that air flow to the heat exchanger during the idle mode is sufficient to inhibit upward migration of condensate through the heat exchanger, but insufficient to cause significant outflow of air through the exhaust.

Preferably the fan is a variable speed fan. For example the fan may have a DC brushless motor. In one example the fan has a maximum rotational speed during the idle mode which is generally 0.02 of its maximum rotational speed during the heating mode.

The controls may be microprocessor based with a capacity for transmission of pulse width modulated (PWM) signals In one example the heat exchanger includes coils of metal tubes. The coils may be of stainless steel.

According to another aspect of the invention, there is provided a method of inhibiting corrosion of burners and igniters in condensing boilers having heat exchangers with a burner and an igniter near the top of the heat exchanger, a condensate exhaust adjacent to the bottom of the heat exchanger, and a fan for supplying an air/fuel mixture to the burner during a heating mode when the fan operates at a relatively high rotational speed. The method comprises operating the fan at a significantly lower rotational speed during an idle mode following the heating mode where the burner is off, the rotational speed of the fan during the idle mode being sufficient to inhibit upward migration of reevaporated condensate through the heat exchanger, but insufficient to cause a significant outflow of air through the condensate exhaust.

The idle mode may continue for a specified period after the heating mode if the boiler does not return to the heating mode. For example, the specified period may be 90 minutes.

DESCRIPTION OF THE PREFERRED EMBODIMENTS

Figure 1A:
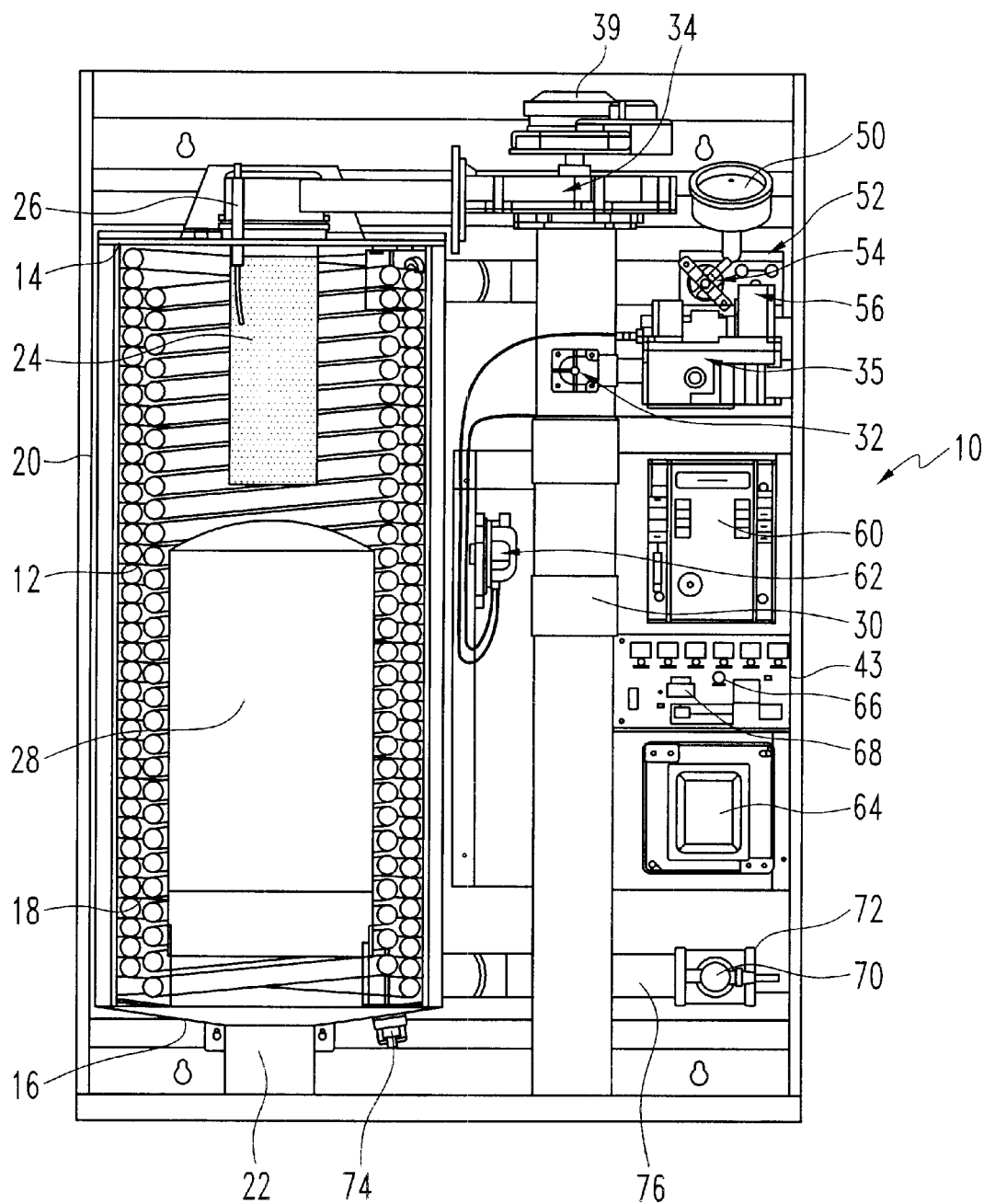
FIGS. 1(a) is an elevational view, partly in section, of a condensing boiler according to a first embodiment of the invention having a fixed firing rate.

Referring to the drawings and first to FIG. 1(a), this shows a condensing boiler 10 according to an embodiment of the invention. The boiler includes a heat exchanger 12 having a top 14 and a bottom 16. The heat exchange includes coils of metal tubing 18 forming a pressure vessel within flue containment shell 20, cylindrical in shape in this embodiment.

The tubing is of stainless steel, 316L stainless steel in this embodiment, although other metals such as 304L, 439 or S44400 stainless steel or other materials may be substituted. It is preferred to use a single alloy, versus substantive mixing of alloys, as an anticorrosion measure.

There is a spent flue gas and condensate exhaust 22 adjacent to the bottom of the heat exchanger.

A burner 24 is located adjacent to the top of the heat exchanger and is provided with an ignition probe 26. The burner in this example is a Acotech Fecralloy Knit 100 unit which is capable of sustained surface combustion. The igniter is an igniter probe/flame sensor of Kanthal Al and alumina ceramic. Other types of igniters could be substituted.

There is an intake system for the boiler which includes an air conduit 30, a fuel inlet 32 and a fan 34 which supplies a fuel/air mixture to the burner during a heating mode and which supplies air to the heat exchanger during an idle mode. The illustrated boiler is adapted to burn natural gas and has a gas orifice plate 37, shown in FIG. 2(a), at the fuel inlet 32 connected to a gas valve 35. The gas valve in one embodiment is a White-Rodgers 36E 36–250 although others could be substituted.

Figure 4:
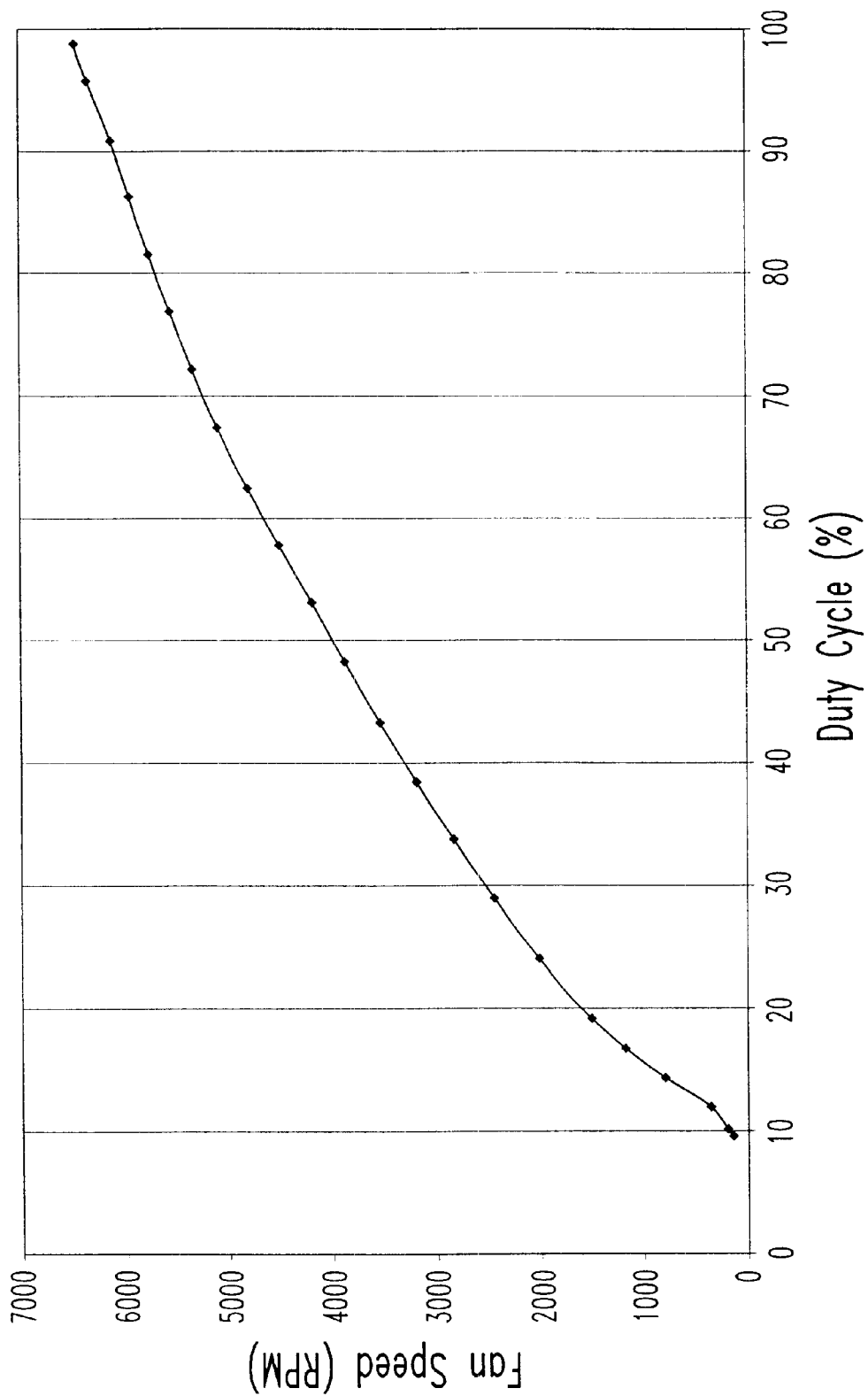
FIG. 4 is a graph plotting rotational speed of the fan against its duty cycle.

The fan incorporates a brushless DC motor 39. In this example the fan is an ebm/mvl RG130/0800 having a 24VDC motor. FIG. 4 shows the operating characteristics of the motor. The supplied voltage in this case is a constant 28 VDC. The fan in this example draws power within the range of 4–40 watts to satisfy its requirements as determined from a pulse width modulation (PWM) signal provided by the controller 41, shown in FIG. 2(a), based on its algorithm and the actual fan loading. A PWM signal at 2 KHz was selected for this embodiment. The controls utilize PWM signals to operate the motor in the range of a 10%–100% duty cycle. However, as may be observed in FIG. 4, there is a significant nonlinearity in the duty cycle, i.e. the speed relationship across the range. At 10% duty cycle the motor operates at a significantly lower speed than 10% of its speed at 100% duty cycle. In this particular example the speed at the 10% duty cycle is approximately 130 rpm which is about 2% of its rotational speed of approximately 6500 rpm at 100% duty cycle.

Figure 1B:
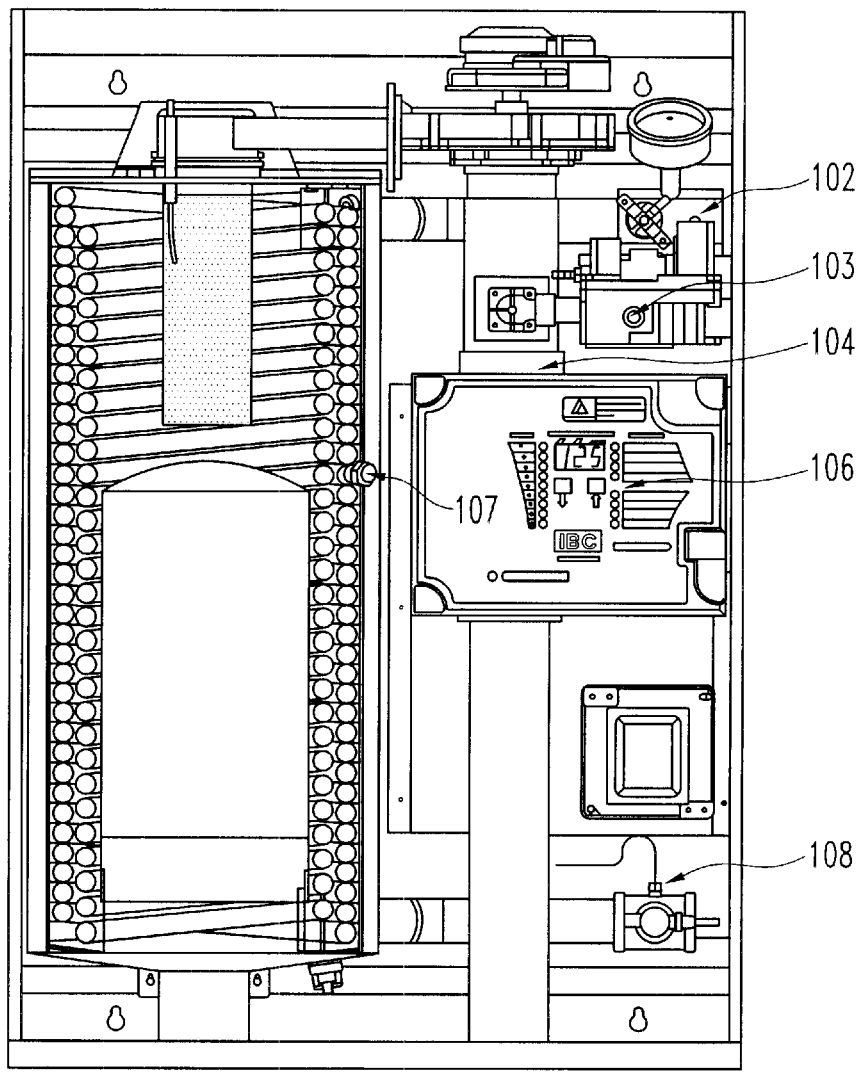
FIG. 1(b) is an elevational view, partly in section, of a condensing boiler according to a second embodiment of the invention having automated, variable heat output components.
Figure 2A:
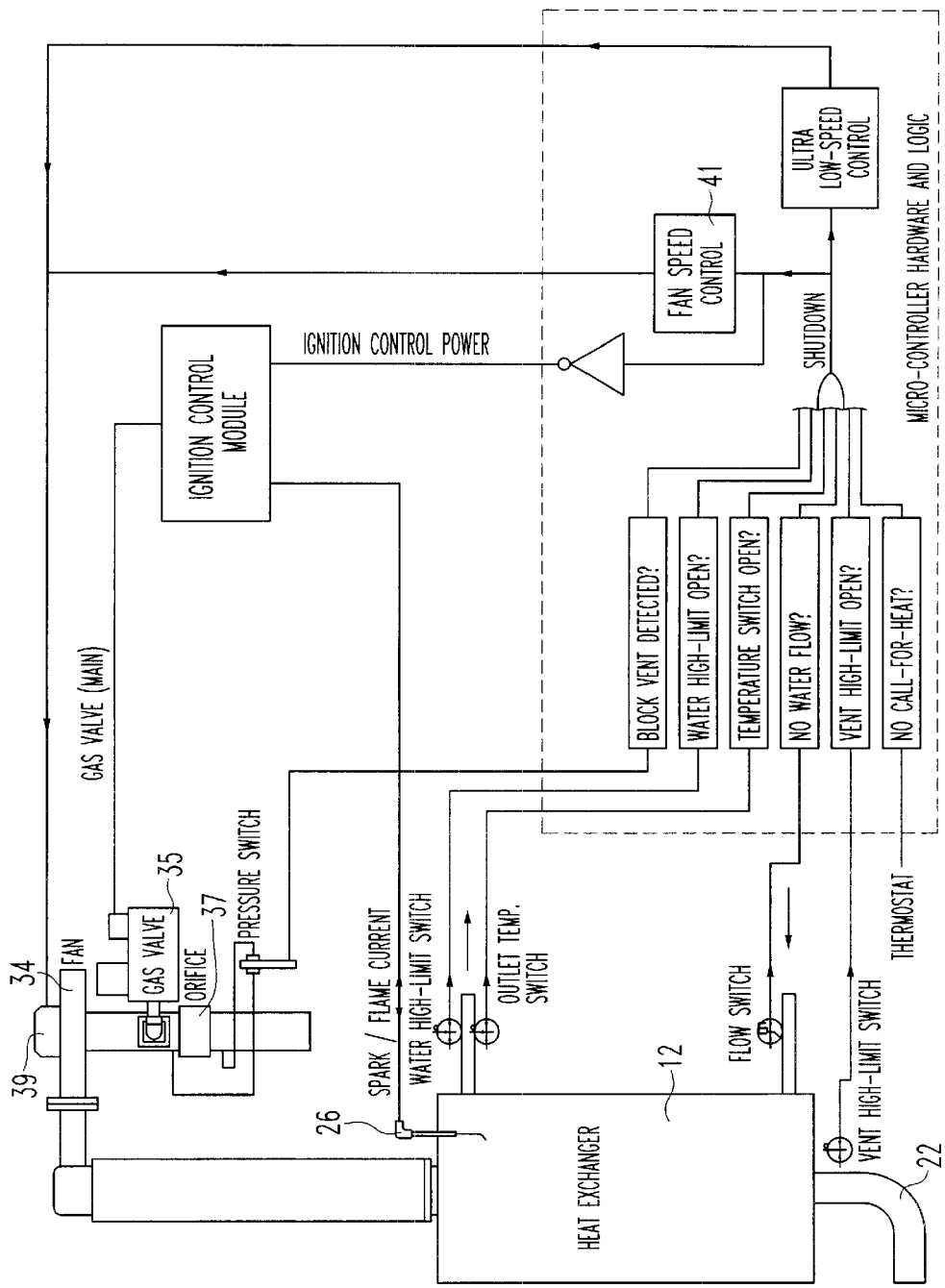
FIG. 2(a) is a schematic diagram of the control system for the embodiment of FIG. 1(a)
Figure 2B:
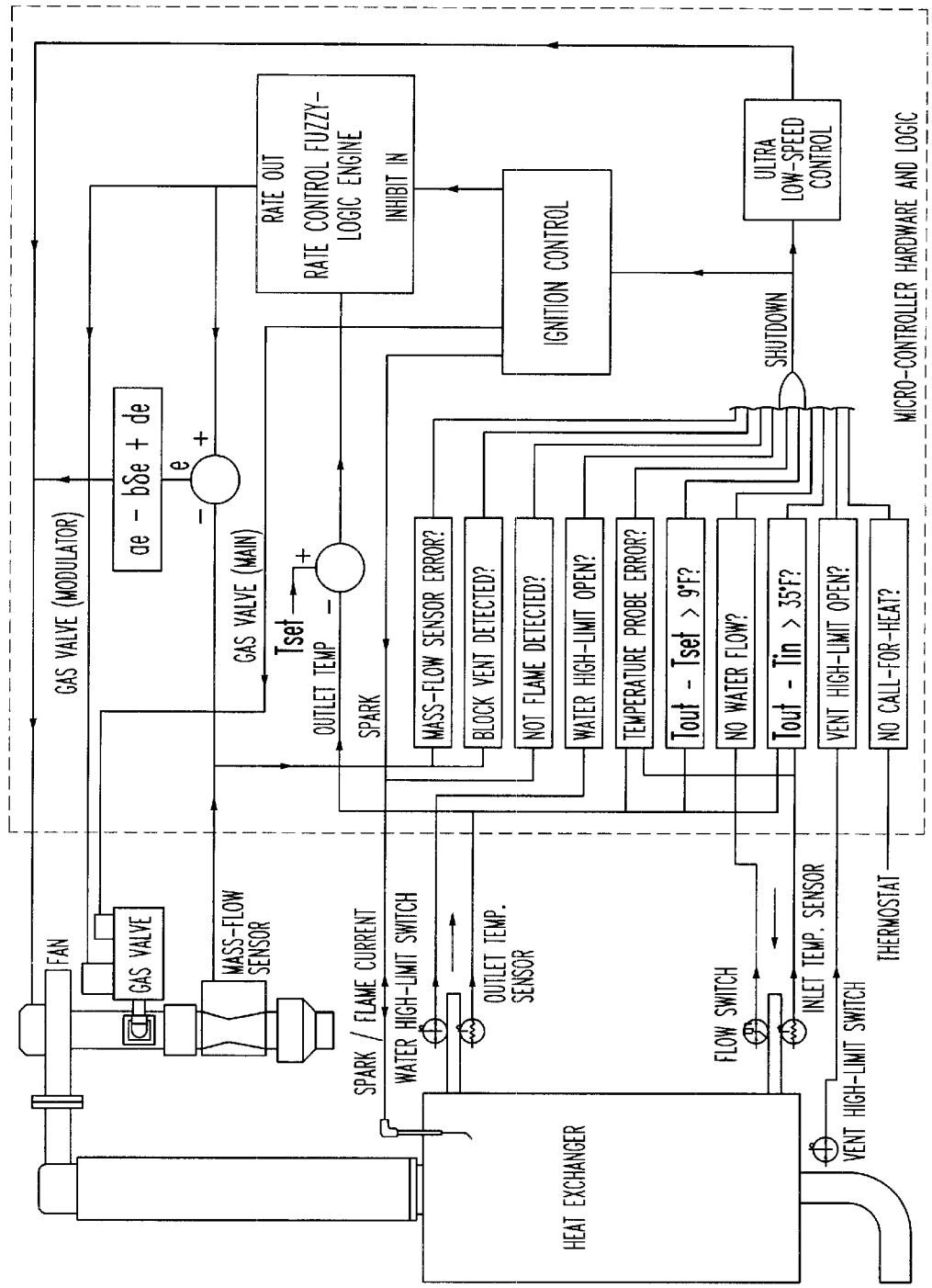
FIG. 2(b) is a schematic diagram of the control system for the embodiment of FIG. 1(b)

The fan as described is one part of a control system addressing all aspects of the operation of the appliance including ignition, heating output and safety circuits. The control circuit utilizes modern semiconductor technology in each of two embodiments of FIG. 1(a) and FIG. 1(b). FIG. 2(a) provides a schematic of the control system for the first version, a simple on/off version which provides operation at a single, fixed heating output. FIG. 2(b) is the control schematic for the more sophisticated embodiment of FIG. 1(b) having a modulating burner output. Common to each embodiment is a microprocessor driven controller which remains powered during the off-cycle. It is available then to manage off-cycle fan, pump and other activities including temperature sensing.

The first, simple on/off version of FIG. 1(a) and 2(a) comprises the fan 34, accompanied by a 24 VAC step down transformer 64 (in this example a Hammond DG2G, 100 VA,(P)120VAC: (S) 24VAC) plus a DC power supply/enunciator unit 66 to provide specific power requirements (e.g. 28 vDC voltage at 4 to 40 watts) to the fan, direct spark ignition probe 26, a direct spark ignition control module 60 (a Honeywell S87J in this example), a differential pressure based airflow proving switch 62 (a Honeywell C6065), water flow proving switch (an Anderson V10 paddle-type) 70, and temperature operator and high-limit safety switches (in this example, these are Therm-O-Disc bi-metal switch 54 with maximum water temperature set to 210° F.; switch 56 which is a circulating temperature controller and vent temperature high limit switch 74. This hardware assembly is complemented by other components typically associated with boiler appliances, such as piping 76, tees 52 and 72, tridicator (water pressure/temperature gauge) 50 and a pressure release valve (located externally).

The foregoing DC power supply/enunciator unit 66 contains a printed circuit board comprising electronic circuitry used in the switching power supply, a wiring bus that offers simplified connection for control circuit switch leads, while protecting the integrity of the series control circuit itself and other functions, such as provision for manual fan speed adjustment and an optional RTD-based electronic temperature operator. A microprocessor, MicroChip# 16C711 in this example, anchors the micro-controller hardware, see FIG. 2(a) for its position in the system control schematic. It has sufficient processing functionality, including internal timers, memory and input/output so as to identify signal inputs, read switch positions, and command fan speed levels in a predetermined priority sequence. The board circuitry makes provision for voltage-to-ground measurement immediately below each control circuit component in turn as a means to determine the state of each switch. The enunciator panel 43 offers an illuminated diode display of certain conditions. Such voltage-to-ground sensing technique is employed in the supervision of the fan. The microprocessor establishes the presence of a call-for-heat through identification of 24 VAC potential to ground immediately below the thermostat when the contacts close. On sensing this condition, the microprocessor's operating routine causes the actuation of the fan by increasing the PWM output signal from its previous state to its normal operating level. The fan has a default speed setting of whatever the fan speed adjust pot 68, located onboard the DC power supply/enunciator unit, is set to. In the fixed firing rate boiler embodiment of FIG. 1(*a*) and 2(*a*), no further fan speed adjustment is commanded during the heating mode (for example when all control and safety circuits contacts are closed) until the end of such mode, which is ordinarily terminated by an end of the call for heat from the thermostat. Upon such event, or any breach of the safety circuit, or upon any power-up of the controller, a routine is triggered within the microcontroller. This activates a post purge sequence which directs the fan to continue to operate at the normal on-cycle duty cycle for a 10 second interval, to exhaust combustion products from the venting and to contribute to the temperature stabilization of the heat exchanger environment. Following such 10 second purge, the on-chip timer adjusts the PWM signal to the 10% duty cycle level for a maximum period of 90 minutes. At such level, the fan turns at approximately 2% of its maximum rotational speed, due to significant nonlinearity in the duty cycle for shown in FIG. 4. Note that these times and other values described above and below can be varied on other embodiments.

The ultra-low speed mode is intended to ensure that no back flow action occurs in the heat exchanger and vent system. Its purpose is to prevent residual condensate on the metal tubes of the heat exchanger from reevaporating from latent heat in flue concentrator plug 28 and heat exchanger tubes 18 and migrating upwardly and recondensing in sections 14, 24, 26, 34, 32, 35 of the gas/air pathway where the corrosive effects of the condensate could damage these components. The ultra-low speed mode is optimized at the lowest possible airflow in the positive direction, to minimize off-cycle stack losses. The mode is terminated at the earlier of (1) interruption by a subsequent call-for-heat (on-cycle), which triggers a high duty cycle pre-purge, or (2) expiry of the ultra-low flow mode time interval (e.g. 90 minutes). Empirical data indicates that the ultra-low flow mode is needed for up to 60 minutes to achieve the necessary temperature equilibrium across the heat exchanger environment to curtail moist back flow.

Figure 5:
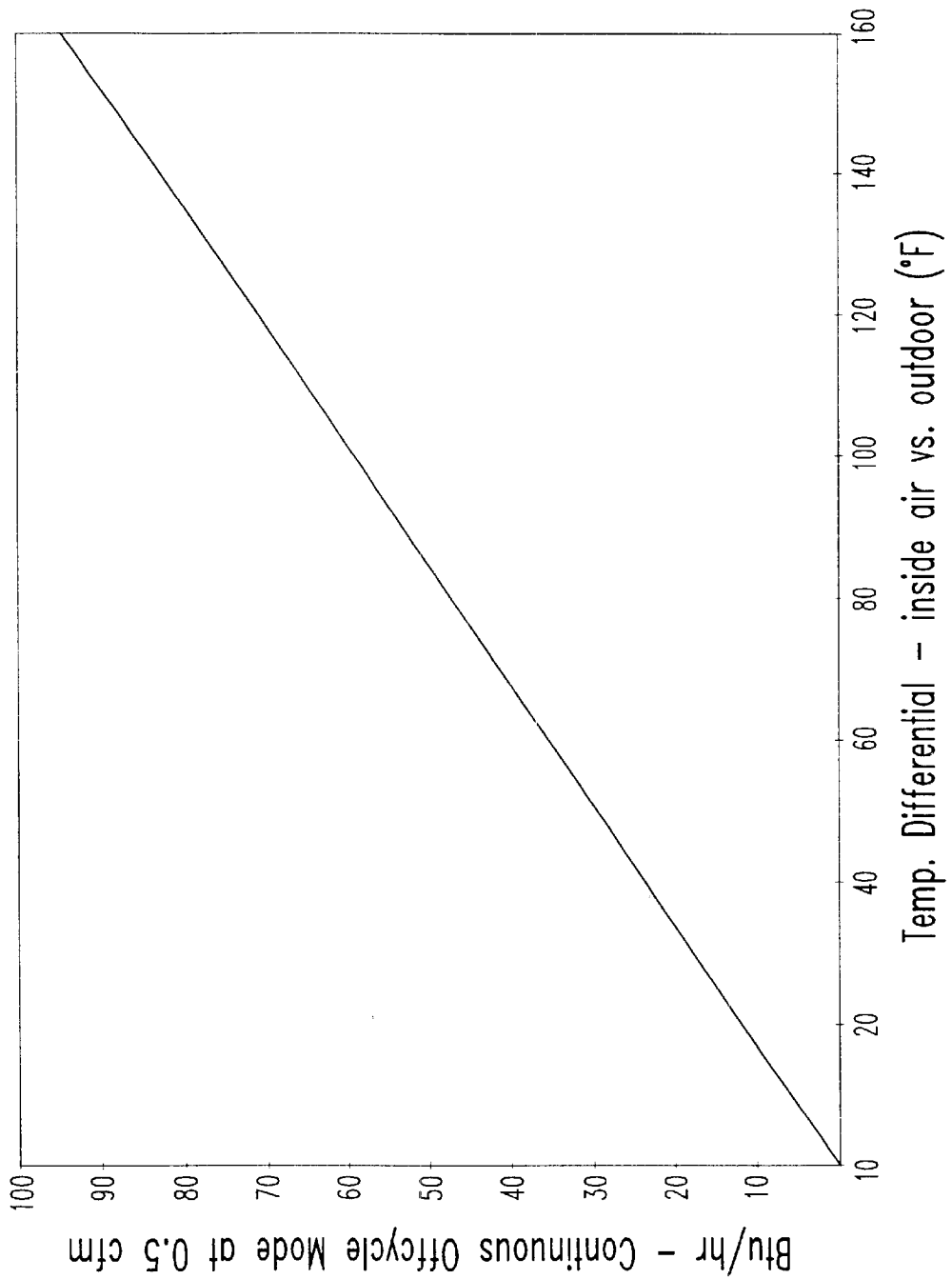
FIG. 5 is a graph depicting the off cycle heat loss rate thereof.

At the fan's slow rotational speed in the ultra-low speed mode, the airflow through the appliance and its vent system falls to a normal volume on the order of 0.5 cpm. Such airflow through the heat exchanger during the initial interval of an off-cycle will result in the minor heat loss in accordance with FIG. 5. For example, an off-cycle loss rate of 71 BTU/hr is reflected for conditions of 120° F. return water and −40° F. outdoor air temperature, conservatively assuming 100 percent heat exchanger efficiency. Such rate translates to an impact on the Annual Fuel Utilization Efficiency (AFUE) as measured in accordance under the relevant American National Standards Institute/ANSI 103 of less than 0.1% based on a typical duty cycle of four 5 minute on-cycles per hour (e.g. 5 minutes on/10 minutes off). At such heat dissipation rate, standing water in the heat exchanger is subject to chilling, which could lead to concern over frozen tubes. The heat exchanger in the preferred embodiment has an internal water volume of 8 liters, resulting in a temperature drop attributable to the fan's off cycle operation alone of approximately 5° F./hour-based on an uninterrupted off-cycle and reasonable internal mixing within the 8 liter body. The low dissipation rate minimizes the risk of freezing water. Natural protection is also afforded due to reduced likelihood of long off-cycles during colder weather.

Figure 1C:
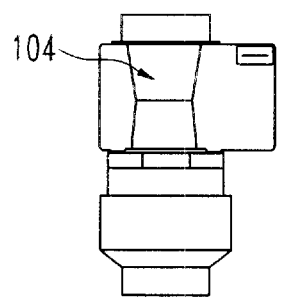
FIG. 1(c) is an elevational view of the airflow sensor for the embodiment of FIG. 1(b)

In another embodiment of the invention providing modulated heating output, as seen in FIG. 1(*b*), 1(*c*) and 2(*b*) the ignition/flame sensing module and the DC power supply/microcontroller unit as described for the previous embodiment are replaced by an electronic control module 106 which integrates power supply and control features covering ignition, variable burner output (throttle) and mixture control. This more sophisticated version incorporates an array of sensors, the water and vent high limits and water flow switches described above, plus thermistor-based solid state temperature probes 102 and 108 (Alpha Sensors #9040-2 in this example) to monitor boiler supply and return water temperatures respectively, a thermistor-based automotive mass airflow sensor 104 (Microtech #49-1007 in this example) and an oxygen-based combustion sensor 107 to monitor heating loads, control the fuel mixture, safety parameters, together with the maintenance of an electronic service log and diagnostics. The modulating unit uses expanded printed circuitry driven by a Microchip #16C77 in this example to provide sufficient processing functionality, including internal timers, memory and input/output so as to identify signal inputs, read or interrogate sensor readings. and command fan speed levels, all in the predetermined priority sequence. The control system for the modulating boiler is shown in FIG. 2(*b*).

Figure 3:
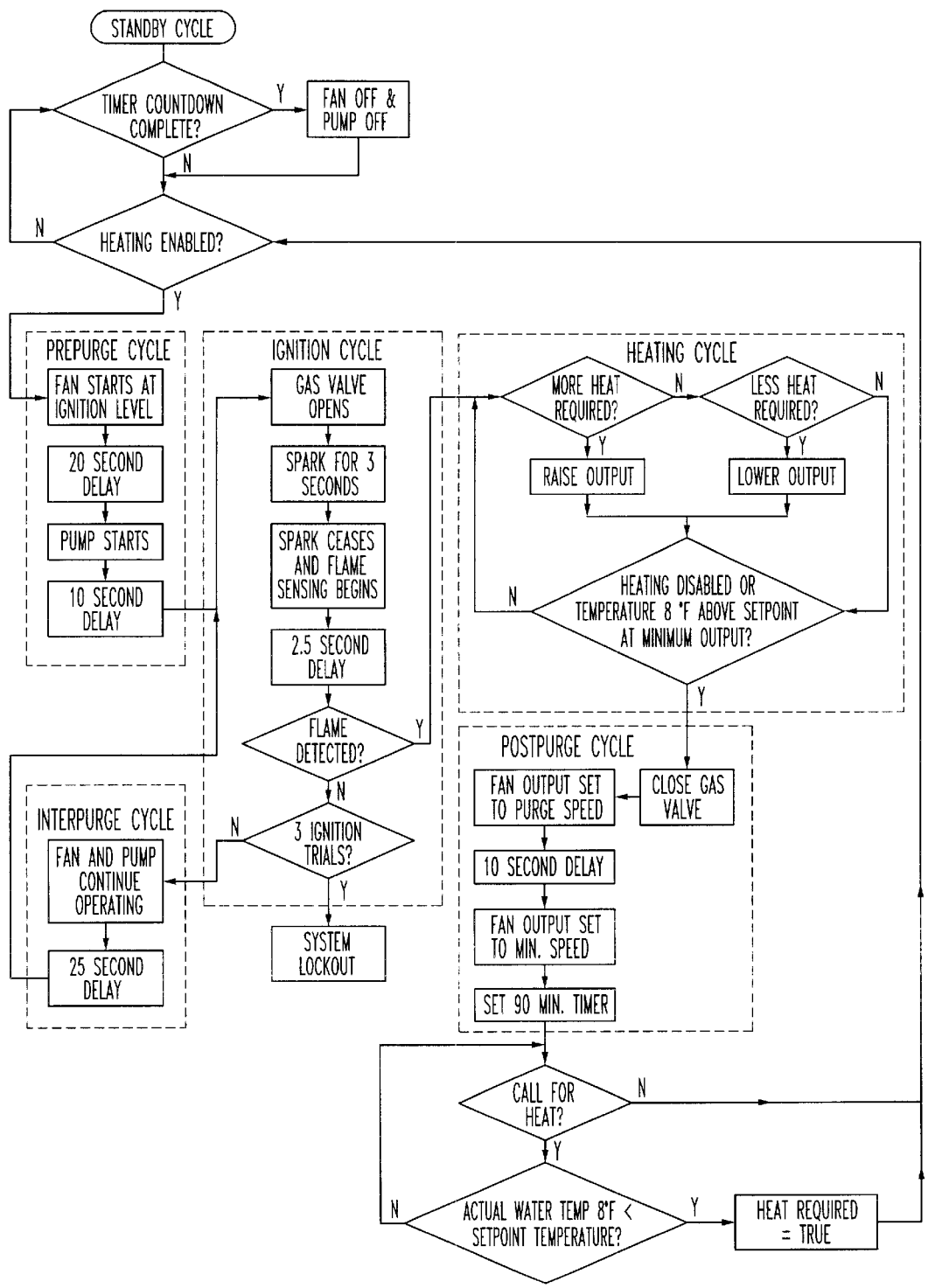
FIG. 3 is a flow chart of the operating algorithm for the embodiment of FIG. 1(b)

The algorithm utilized in the embodiment, providing modulated heating output, is illustrated in FIG. 3. When heating is required, and the thermostat is closed, the fan enters a Prepurge cycle, where airflow is brought to a predetermined level, as interpreted at the micro-controller based in inputs from the mass air flow sensor 104. Thereafter, in the Ignition routine, the gas valve (in this version, a White Rodgers 36E27 solenoid driven adjustable valve) 103 is opened and the fan continues to operates at sufficient duty cycle to deliver the air/fuel mixture to the burner where it is ignited by the igniter. During the heating cycle, the outlet water temperature from the boiler is measured (at sensor 102) and evaluated in accordance with the controller's programmed heating algorithm. Heating output is increased or decreased as appropriate within the available range through actuated changes to air flow and gas flow in concert, to maintain a stable mixture. Fan speed is altered via modification of the PWM signal while gas flow is modified by changes to the electrical current (within the range 50–180 mA) delivered to the gas valve from a voltage to current converter, itself driven by a D/A converter (each located onboard the ECM 106). After the heating requirements are satisfied, the thermostat opens and the boiler enters a Post-purge cycle for a period of time. The algorithm provides for a 10 second air-purge at the normal on-cycle scale flow rate, to clear exhaust from the vent, then the fan's PWM signal is modified to the minimum 10% duty cycle. The ultra-low flow mode is run for 90 minutes, which experience shows is the time required to achieve equilibrium conditions (e.g. where no back flow can foul a subsequent ignition—nor are any signs of moisture noted in the unit.).

As in the equivalent mode in the fixed firing rate boiler version, the ultra-low flow mode runs for 90 minutes, or less if interrupted by a return to the heating mode as dictated by the thermostat. The low flow mode is interrupted by any new heating cycle and the timer counter is reset for the next off-cycle event. The unit also defaults to the low-flow mode upon initial power-up, to deal with any potential forced shutdowns, for example power outages which left the unit wet.

The off-cycle stack loss for the modulating control version would be expected to be lower than for the fixed firing rate version, given the capacity of the former for large burner turn down and a lower level of on/off cycling.

Such low rates of off-cycle heat loss are facilitated through use of a fan, as in the preferred embodiments, having a wide controllable speed range. Typical on/off fans or dual speed units used in two-stage boilers (with lower firing rate at a typical 50 percent duty) would move 20–50 times as much air if used in a post purge/back flow-check mode, causing heat loss of 1,900 to 4,800 BTU/hour in a 130 MBII-sized boiler-creating a risk of frozen pipes, unless water circulation is maintained continuously with the fan throughout the full post purge. In any case, a seriously negative AFUE impact would be experienced: up to 3 percent or one-third to one-half of the incremental benefit otherwise achieved by going into the condensing regime.

Increased air flow over wetted surfaces (higher evaporation) increases the concentration of the hydrochlorides, plus any lesser corrosive compounds, such as sulfuric, nitric or carbonic acids, aggravating the corrosion rate as long as such agents remain suspended in water. Once dry, the corrosion process is essentially halted. The invention minimizes air movement to check back flow and neutralize any residual heat in the boiler to eliminate the primary drivers of back flow such as convective upward air movements within the heat exchanger. The method does not have as a primary objective the complete drying of internal heat exchanger surfaces. This could have a net negative impact on the progress of corrosion. In normal service, the ultra-low flow moisture control cycle would be interrupted by the next heating cycle well before substantial drying takes place. However there will be certain conditions in which the ultra-low flow moisture control cycle will result in an accelerated/complete drying of the heat exchanger. For example this may occur in installations with domestic/potable water heating as an integral feature and periodic domestic water usage in summer occurs, for example without recurring space heating demands on the boiler. In such cases, the accelerated drying will have a net favorable corrosion effect by shortening the chemically active period.

It will be understood by someone skilled in the art many of the details provided above are by way of example only and are not intended to limit the scope of the invention which is to be interpreted with reference to the following claims.

What is claimed is:

1. A condensing boiler, comprising:
   a heat exchanger having a top and a bottom;
   a burner adjacent to the top of the heat exchanger;
   an exhaust for spent flue gas and condensate adjacent to the bottom of the heat exchanger;
   an intake system including an air conduit, a fuel inlet and a fan which supplies a fuel/air mixture to the burner during a heating mode and which supplies air to the heat exchanger during an idle mode; and
   controls which modulate the fan so that the air flow to the heat exchanger during the idle mode is sufficient to inhibit upward migration of condensate through the heat exchanger, but insufficient to cause significant outflow of air through the exhaust.

2. A boiler as claimed in claim 1, wherein the fan is a variable speed fan.

3. A boiler as claimed in claim 2, wherein the fan has a DC brushless motor.

4. A boiler as claimed in claim 2, wherein the fan has a rotational speed during the idle mode which is generally 0.02 of its rotational speed during the heating mode.

5. A boiler as claimed in claim 1, wherein the controls are pulse width modulation controls.

6. A boiler as claimed in claim 1, wherein the heat exchanger includes coils of metal tubes.

7. A boiler as claimed in claim 6, wherein the coils are of stainless steel.

8. A boiler as claimed in claim 7, wherein the stainless steel is 316L stainless steel.

9. A boiler as claimed in claim 1, wherein the burner is an infrared burner.

10. A method of inhibiting corrosion of burners and igniters in condensing boilers having heat exchangers with a burner and an igniter near the top of the heat exchanger, a condensate exhaust adjacent to the bottom of the heat exchanger and fan for suppling an air/fuel mixture to the burner during a heating mode when the fan operates at a relatively high rotational speed, the method comprising:
    operating the fan at a significantly lower rotational speed during an idle mode, following the heating mode, where the burner is off, the speed of the fan during the idle mode being sufficient to inhibit upward migration of condensate through the heat exchanger, but insufficient to cause a significant outflow of air through the condensate exhaust.

11. A method as claimed in claim 10, wherein the rotational speed of the fan during the idle mode is generally 0.02 of its rotational speed during the heating mode.

12. A method as claimed in claim 10, wherein the idle mode continues for a specified period of time after the heating mode if the boiler does not return to the heating mode prior to the expiry of said period.

13. A method as claimed in claim 12, wherein the specified period is 90 minutes.

* * * * *